United States Patent [19]

Lindstol

[11] 4,082,664
[45] Apr. 4, 1978

[54] FILTER AND METHOD

[75] Inventor: Anders Lindstol, Oakville, Canada

[73] Assignee: Ecodyne Corporation, Lincolnshire, Ill.

[21] Appl. No.: 802,927

[22] Filed: Jun. 2, 1977

Related U.S. Application Data

[63] Continuation-in-part of Ser. No. 699,775, Jul. 22, 1976, abandoned.

[51] Int. Cl.² .............................................. B01D 23/24
[52] U.S. Cl. ....................................... 210/80; 210/82; 210/271; 210/277; 210/333 A
[58] Field of Search ...................... 210/79, 80, 82, 264, 210/271, 272, 273, 275, 277, 286, 293, 333 R, 333 A, 411, 427

[56] References Cited

U.S. PATENT DOCUMENTS

| | | | |
|---|---|---|---|
| 1,086,477 | 2/1944 | Stahn | 55/287 X |
| 2,802,572 | 8/1957 | Jalkanew | 210/82 |
| 3,176,846 | 4/1965 | Adams | 210/333 A |
| 3,473,661 | 10/1969 | Duff | 210/82 |
| 3,547,270 | 12/1970 | Kass | 210/264 |
| 3,701,423 | 10/1972 | Lindstol | 40/80 |

Primary Examiner—William A. Cuchlinski, Jr.
Attorney, Agent, or Firm—Charles M. Kaplan; Joel E. Siegel

[57] ABSTRACT

The rotating backwash isolation hood of a multibed filter is raised and lowered by either hydraulic forces and gravity, or by an improved mechanism employing a pair of pistons and cylinders and a perforated indexing disc, or by both of these arrangements. The force required to lift the hood is reduced by eliminating the effect of the static head of the liquid above the hood. Leakage between the hood and the filter it covers is detected by a pressure differential indicating switch. A floculator may be combined with the multibed filter, and the dirty backwash liquid from the hood may be recirculated into the floculator.

57 Claims, 11 Drawing Figures fig. 6.

FILTER AND METHOD

BACKGROUND OF THE INVENTION

This application is a continuation-in-part of United States application for letters patent Ser. No. 699,775, filed July 22, 1976, now abandoned.

This invention relates to liquid filtration, and more particularly to processes for gravity filtration and filters with a rotating hood for isolating discrete beds of filter material during backwashing.

There are inherent economies and advantages in multiunit filters in which an individual filter unit is isolated from a common chamber of unfiltered influent for backwashing, while the remaining units continue to produce filtered effluent. Since the filter media is segregated into several discrete beds, the backwash flow required by any single bed is so small that the beds remaining in service can provide sufficient filtered liquid. The relatively small volume of dirty backwash liquid can be returned directly to a clarifier or flocculator combined with the filters or to waste without the danger of hydraulically upsetting the system. Since only one bed is backwashed at a time, the service flow from the multibed filter is essentially constant. The multiunit filter design has been extensively used for totally enclosed strainer or cartridge type pressure filters of relatively moderate or small size. It has been necessary in such totally enclosed pressure filters to use mechanical implements to force the isolation device into sealing engagement with the unit being backwashed. However, this multiunit design has not been employed on gravity filters. One reason for the lack of use of the multiunit design on large gravity filters has been the unavailability at a reasonable cost of suitable prior art mechanical sealing mechanisms that are easily movable and operable over large surfaces and distances inherent in the common gravity filter designs.

SUMMARY OF THE INVENTION

Accordingly, it is an object of this invention to provide an improved liquid filter and an improved process for backwashing same.

Another object is to provide a multiunit gravity liquid filter having a movable hood that isolates individual units for backwashing.

Another object is to provide a multiunit filter having a movable hood that does not require mechanical implements to directly force the hood into sealing engagement during backwashing or to release the hood from such engagement.

Another object is to provide a multicell liquid filter with a movable backwash isolation hood that is sealed and released from sealing by hydraulic and gravitational forces.

Another object is to provide a multicell liquid filter that is simple, relatively low cost, durable, and that does not have defects found in corresponding prior art equipment.

Another object is to provide a liquid filter backwashing process in which a filter cell isolation hood floats out of sealing contact with the cell after backwashing, and sinks into sealing contact under the influence of gravity.

Another object is to provide a process and apparatus in which the force required to lift the movable backwash isolation hood of a multiunit filter is reduced.

Another object is to provide a way of detecting leakage between the movable backwash isolation hood of a filter and the surfaces against which it seals.

Another object is to provide an improved mechanism for lifting, rotating and lowering the movable backwash isolation hood of a filter.

Another object is to provide a multiunit filter in which one unit at a time is backwashed and the dirty backwash liquid is returned to the untreated liquid flowing to the filter.

Another object is to provide a combined filter-flocculator that discharges only filtered liquid effluent and sludge.

Still other objects and advantages will be revealed in the specification and claims, and the scope of the invention will be set forth in the claims.

Briefly stated, in accordance with one aspect of the invention, a hollow backwash isolation hood of a multicell gravity filter is sealed against the filter cell being backwashed by gravity and hydraulic pressure and floated out of such sealing contact by gas pressure.

DESCRIPTION OF THE INVENTION

FIGS. 1-5 show an embodiment of a gravity liquid filter 1 comprising numerous discrete filter beds 2 occupying an open-topped cylindrical container tank 3. Beds 2 are preferably granular filter material 4, such as sand, gravel, coal, activated carbon, or a combination of such materials, supported on a perforated plate 6 that spans the interior of tank 3. Strainers 7 surround each perforation in plate 6 and prevent escape of filter material 4. Upstanding radial partitions 8 separate beds 2. The upper, perpendicular, terminal flanged edge 9 of each partition 8 extends above the beds 2, and flanged edges 9 all lie in the same horizontal plane. A peripheral flange 10 is connected to and in the same plane as flanged edges 9.

Figures 1, 2, 5:
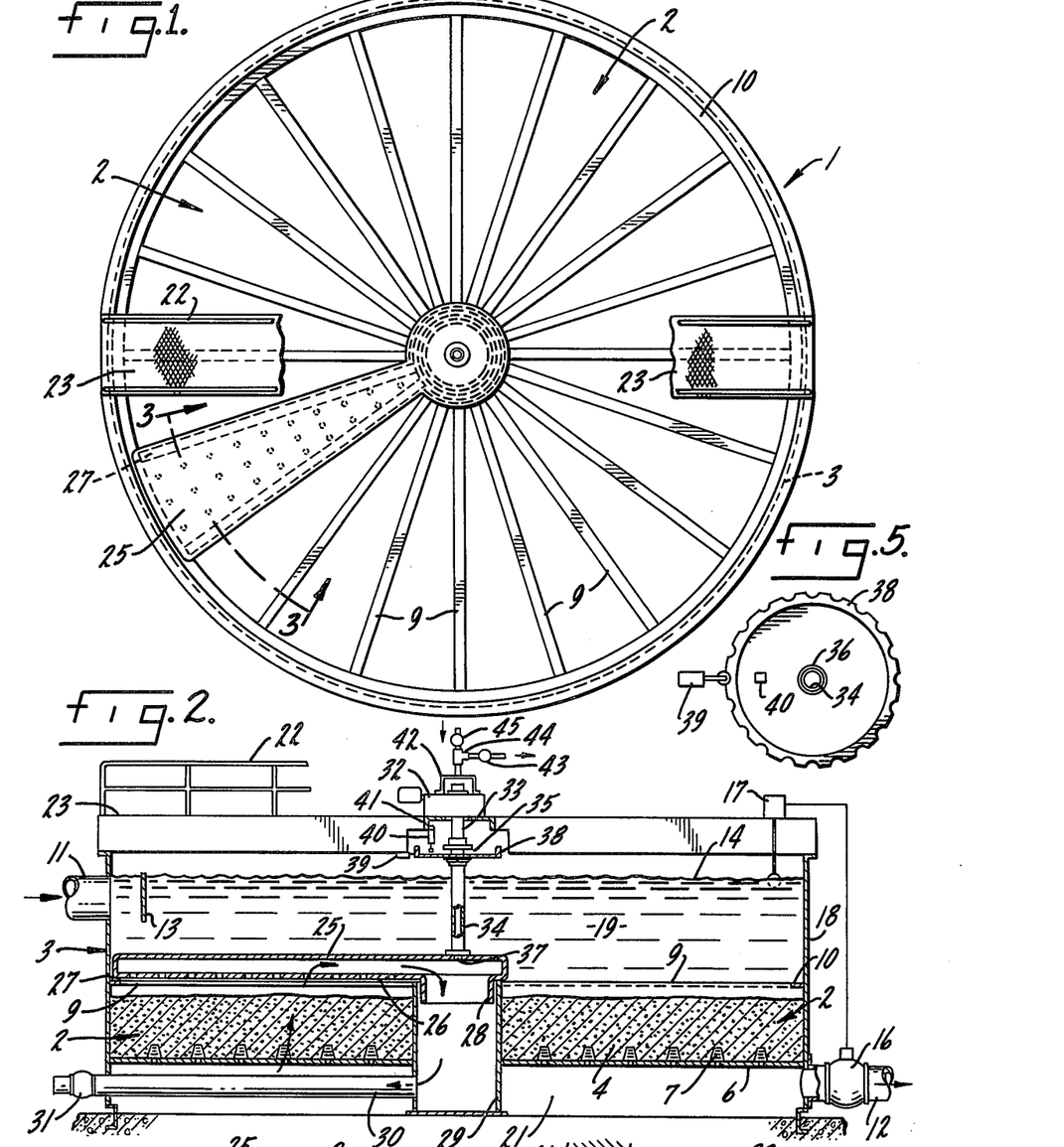
FIG. 1 is a partially broken-away, top plan, schematic view of one embodiment of the invention.
FIG. 2 is a cross-sectional view of the invention shown in FIG. 1.
FIG. 5 is a top plan view of a reduced scale of the coupling shown in FIG. 4.

Liquid to be treated enters filter 1 through an inlet pipe 11 and exits through a filtered effluent outlet pipe 12. A baffle 13 dissipates the energy of the incoming liquid. The level 14 of the liquid in tank 1 is kept at a predetermined height above edges 9 by an outlet valve 16 which has the size of its port controlled in a conventional manner by a liquid level sensing float mechanism 17. The portion 18 of the wall of tank 3 extending above beds 2 defines an unfiltered liquid or flocculation chamber 19 which collects an atmospheric pool of liquid of sufficient depth standing on beds 2 to cause the unfiltered liquid to percolate under the influence of gravity through material 4. Plate 6 defines therebeneath a filtered liquid chamber 21 in communication with outlet 16. Conventional accessories, such as a guard rail 22 and catwalk 23 should be provided when required.

When tank 3 is filled, liquid accumulates in chamber 19 until there is sufficient static head to cause it to pass through filter material 4, leaving most or all of the undesired contaminants on or in beds 2. When the amount of filtered contaminants on or in beds 2 reaches somes predetermined quantity, it is necessary to begin backwashing, one bed at a time.

Figure 3:
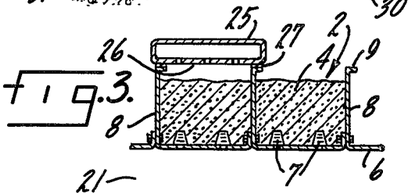
FIG. 3 is a cross-sectional view taken along the line 3—3 in FIG. 1.

A hollow backwash hood 25 is mounted for rotation around the center of filter 1. The flat undersurface 26 of hood 25 is perforated to permit liquid to flow into hood 25, and a pliable gasket 27 extends around the periphery of undersurface 26 for sealing against flanged surfaces 9 and 10. A protruding cylindrical collar 28 extends perpendicularly from the inner end of hood 25 into center pipe 29. Collar 28 acts as a guide and a bearing for hood 25 and also enables liquid to flow out of hood 25 into pipe 29. The space between pipe 29 and collar 28 is sealed by a suitable gasket that permits collar 28 to rotate and to move up and down in pipe 29. A backwash outlet pipe 30 is connected to center pipe 29, and a backwash valve 31 opens and closes outlet pipe 30.

Figure 4:
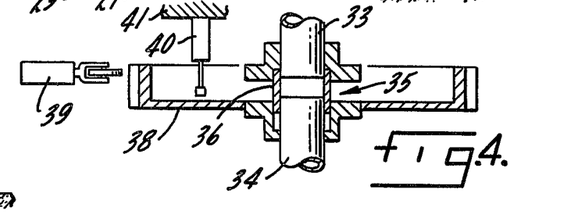
FIG. 4 is an enlarged, partially broken-away, cross-sectional view of a drive coupling for the hood.

Hood 25 is turned by a gear-motor 32 that is controlled by a conventional timer, pressure, or liquid-level actuated electrical circuit. Gear-motor 32 rotates a first hollow, open-ended shaft 33 that is connected in a gas-tight manner to a second hollow, open-ended shaft 34 by a coupling 35. The upper end of shaft 34 slides vertically up and down in sleeve 36 of coupling 35. The lower end of shaft 34 is attached to hood 25, and the inside of shaft 34 communicates with the inside of hood 25 through a port 37. A slotted indexing disc 38 attached to pipe 34 and a positioning switch 39 shut off gear-motor 32 when hood 25 is moved to the correct position over the next bed 2 in need of backwashing. Limit switch 40 mounted on support 41 detects the vertical position of disc 38 as it moves vertically up and down with hood 25 and provides a signal that gasket 27 is disengaged from the surfaces 9 when switch 40 is actuated by contact with disc 38. The upper end of shaft 33 extends above gear-motor 32 into an airtight housing 42. An electrically operated vent valve 43 is connected to the inside of housing 42 through a T-connection 44. An electrically operated valve 45 connects the inside of housing 42 to a source of pressured air or other gas through T-connection 44.

When a bed 2 has been sufficiently backwashed to render it suitable for return to filtering service, the conventional control circuit closes valves 31 and 43 and opens valve 45. Gas under pressure passes into housing 42 and enters pipe 33. The gas pressure is transmitted into pipe 34 and expells liquid therefrom. Pressurized gas enters hood 25 through port 37 and displaces backwash liquid through the filter material 4 in bed 2 into chamber 21, thus breaking the seal between surfaces 9 and 10 and gasket 27. When sufficient gas has entered hood 25, the hood floats up a short distance out of contact with surfaces 9 and 10. This vertical movement of hood 25 carries pipe 34 and attached disc 38 upwardly until limit switch 40 contacts and is actuated. Tripping of limit switch 40 causes the control circuit to actuate gear-motor 32, which rotates shafts 33 and 34 until movement of indexing disc 38 trips positioning switch 39. Actuation of switch 39 stops gear-motor 32 when hood 25 is properly positioned over the next bed 2 in need of backwashing and also causes the control circuit to close pressure valve 45 and open vent valve 43. When valve 43 is opened, the interior of hood 25 is vented to the atmosphere. The static head from the liquid in chamber 19 forces liquid into hood 25 and displaces gas up pipe 34 and out through valve 43. When all or almost all of the gas has been expelled from hood 25, it will sink under the influence of gravity until gasket 27 rests on the flanged surfaces 9 and 10 surrounding the next bed in need of backwashing. This lowers disc 38 and thereby actuates switch 40, thus providing a signal which opens valve 31. The lower static head at valve 31 draws filtered liquid from chamber 21 up through the strainers 7 into the bed 2 being backwashed. The filtered liquid flushes contaminates from such bed into hood 25, down center pipe 29, and out through pipe 30. The greater static pressure in chamber 19 forces hood 25 against flange surfaces 9 with sufficient force to seal gasket 27. However, no harm results if gasket 27 does not seal perfectly, because the unfiltered liquid which would then leak into hood 25 mixes with the dirty liquid resulting from backwashing of the filter bed and is expelled from filter 1 through pipe 30. If desired, as for example when the liquid being filtered is sewage or when solids are being flocculated in chamber 19, the dirty liquid leaving through pipe 30 can be pumped directly back into chamber 19 for continued treatment, in which case valve 31 can be replaced by or used with a pump. Solids or floc which accumulate in chamber 19 can be removed by an air lift pump or other conventional means.

Figure 6:
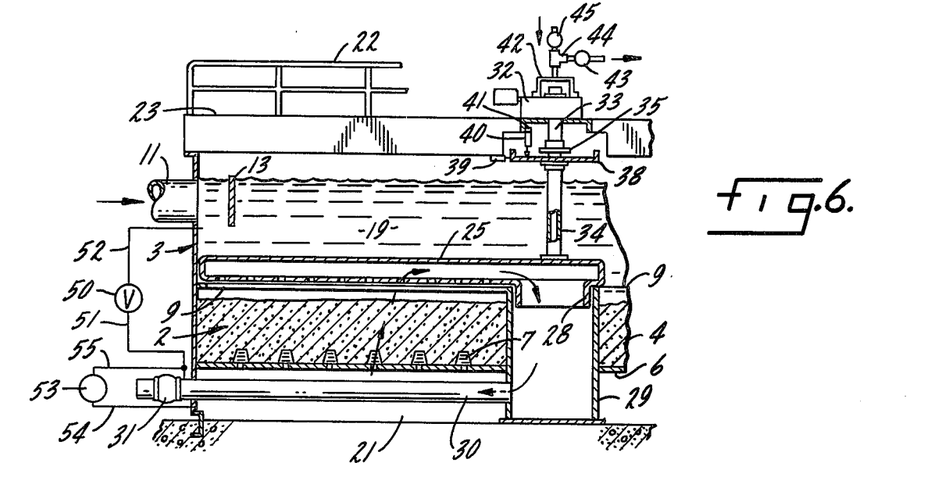
FIG. 6 is a broken-away cross-sectional view corresponding to FIG. 2 and including pressure equalizing and leak detecting means in accord with this invention.

FIG. 6 shows how the force required to lift hood 25 can be reduced, and also how the degree, if any, of leakage between hood 25 and flanges 9 can be detected. The force required to lift hood 25 is reduced by equalizing the pressure on opposite sides of hood 25 at the same time as, or just before, valves 31 and 43 are closed and valve 45 is opened. This is accomplished by connecting electrically operable valve means 50 to backwash pipe 30 by conduit 51 and to chamber 19 by conduit 52, and by opening valve means 50 before starting to raise hood 25. This immediately overcomes the effect on hood 25 of the static head in chamber 19, and reduces the force required to lift hood 25 to an amount equal to its weight plus the friction and inertia of the moving parts. This reduces the amount of air which must be pumped into hood 25 and hence the time needed to index the hood to the next filter to be backwashed. Valve 50 is closed before backwashing of the next unit is started.

An indicating pressure differential switch 53 is connected by a conduit 54 to filtered liquid chamber 21, and to conduit 51 between valve means 50 and pump 39 by a conduit 55. When valve 50 is closed and hood 25 is seated on edges 9, switch 53 will indicate zero pressure differential when there is no leakage under hood 25. The greater the leakage the greater will be the pressure differential indicated by switch 53. Switch 53 can be connected in a conventional circuit which can sound an alarm, or prevent the start of the backwash cycle if the pressure differential, and hence the leakage, is above a predetermined amount. An indicating pressure differential switch suitable for use as described herein is obtainable from Ellison Instrument Company of Boulder, Colorado, as their Eagleeye Model 77c.

Figures 7, 8, 9:
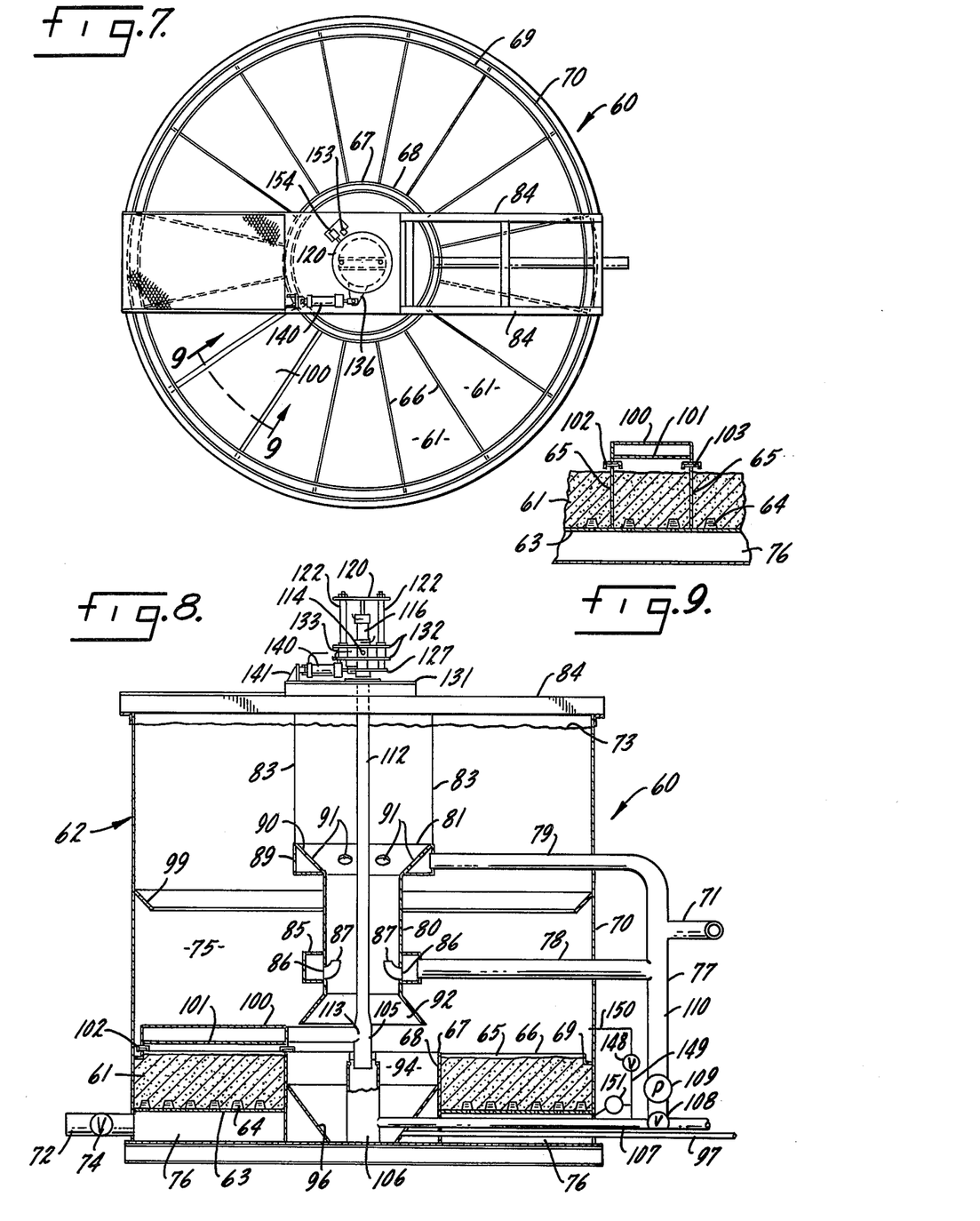
FIG. 7 is a top plan schematic view of another embodiment of the invention.
FIG. 8 is a cross-sectional view of the embodiment shown in FIG. 7.
FIG. 9 is a cross-sectional view taken along the line 9—9 in FIG. 7.

FIGS. 7 and 8 show another embodiment of the invention to be a combined gravity liquid filter and floculator 60 having numerous discrete filter beds 61 occupying an open-topped cylindrical container tank 62. Beds 61 are made of the same materials as in the embodiment of FIGS. 1 through 5, and are supported on a perforated plate 63 that spans the interior of tank 62. Strainers 64 surround each perforation in plate 63. Upstanding radial partitions 65 separate beds 61, and the upper terminal edges 66 of each partition 65 extend above beds 61 and lie in the same horizontal plane. The upper terminal edge 67 of a cylindrical wall 68 and an outer peripheral rim 69 are connected to, and terminate in the same plane as, edges 66. Rim 69 is spaced from side wall 70 of tank 62 to provide clearance for the hood seal.

Liquid to be treated enters through inlet pipe 71, and filtered effluent exits through outlet pipe 72. The level 73 of the liquid in tank 62 may be kept at a predetermined height by an outlet valve 74, which has the size of its port controlled in the same manner as described above with reference to valve 16. The portion of wall 70 extending above beds 61 defines an unfiltered liquid and floculation chamber 75 which collects an atmospheric pool of liquid of sufficient depth standing on beds 61 to cause the unfiltered liquid to percolate under the influence of gravity through the filter media. Plate 63 defines therebeneath a filtered liquid chamber 76 in communication with outlet 72.

Incoming liquid from pipe 71 passes into header pipe 77 and then into distribution pipes 78 and 79. A generally cylindrical vertical floculation column 80 is centered in tank 62, and its top edge 81 terminates below liquid level 73. Cables 83 support column 80 from beams 84 which span tank 62. Pipe 78 enters a header 85 on the outside of column 80. Liquid flows from pipe 78 into header 85 and then through holes 86 into adjustable nozzles 87. Liquid and solids expelled from nozzles 87 cause a turbulent upward swirling and mixing of the contents of column 80, which promotes floculation. Pipe 79 enters a header 89 on the outside of an outwardly flaring end portion 90 of column 80. Liquid and solids flow through holes 91 and continue to promote floculation as the liquid and solids leave column 80 and enter floculation chamber 75, where the solids continue to floculate as they settle on the top of filters 61. Sedimentation also occurs in column 80, and solids fall through a quiescent zone 92 defined by an outwardly flaring bottom portion 93. The solids settle into a collection chamber 94 defined by cylindrical wall 68, which serves as an inner end wall of filters 61 and of their common filtered liquid chamber 76. Liquid and solids are drawn under bottom portion 93 from chamber 75 by the upward swirling flow from nozzles 86; some of such solids settle into collection chamber 94. An inverted conical wall 96 guides the settled solids toward the center where they are withdrawn in conventional manner through a sludge blowdown pipe 97. Chemicals which promote floculation may be added to the liquid in pipe 71, or in column 80, or in chamber 75.

After liquid has filled chamber 75, there is sufficient static head to cause it to pass downwardly through filter beds 61 into chamber 76 and out through pipe 72, leaving most or all of the undesired contaminants on or in the beds. Solids in floculation chamber 75 also sedimentate on to beds 61, and a peripheral, tilted baffle 99 attached to wall 70 directs the settling solids towards the center of tank 62. When the amount of contaminants on or in beds 61 reaches some predetermined quantity, it is necessary to begin backwashing, one bed at a time.

A hollow backwash hood 100 is mounted for rotation around the center of tank 62 underneath portion 93. The underside 101 of the hood is perforated to permit entry of backwash liquid. An inverted U-shaped flange 102 is pie-shaped like the top of each filter 61, as defined by edges 66 and portions of rims 67 and 69, and extends around the underside of hood 100. A pliable gasket 103 held within flange 102 seals against the upper terminal edge of the filters. A protruding cylindrical collar 105 extends perpendicularly from the inner end of hood 100 into a center pipe 106. Collar 105 acts as a guide and a bearing for hood 100 and also directs backwash liquid flowing out of hood 100 into pipe 106. The space between pipe 106 and collar 105 is sealed by suitable gasket means that permits collar 105 to rotate and also to move up and down in pipe 106. A backwash outlet pipe 107 is connected to pipe 106, and a three-way backwash valve 108 opens and closes pipe 107. Opening of valve 108 causes filtered liquid to flow upwardly from chamber 76 through plate 63 and thus to backwash a bed 61. A recirculation pump 109 may be used to recirculate all or some of the dirty backwash liquid and solids through return pipe 110 to header pipe 77, from which the backwash liquid and solids mix with incoming liquid and are distributed through pipes 78 and 79 into floculation column 80. When all of the backwash liquid and solids are recirculated into chamber 80, the only effluents from combined filter-floculator 60 are treated liquid from pipe 73 and sludge from pipe 97.

Figures 10, 11:
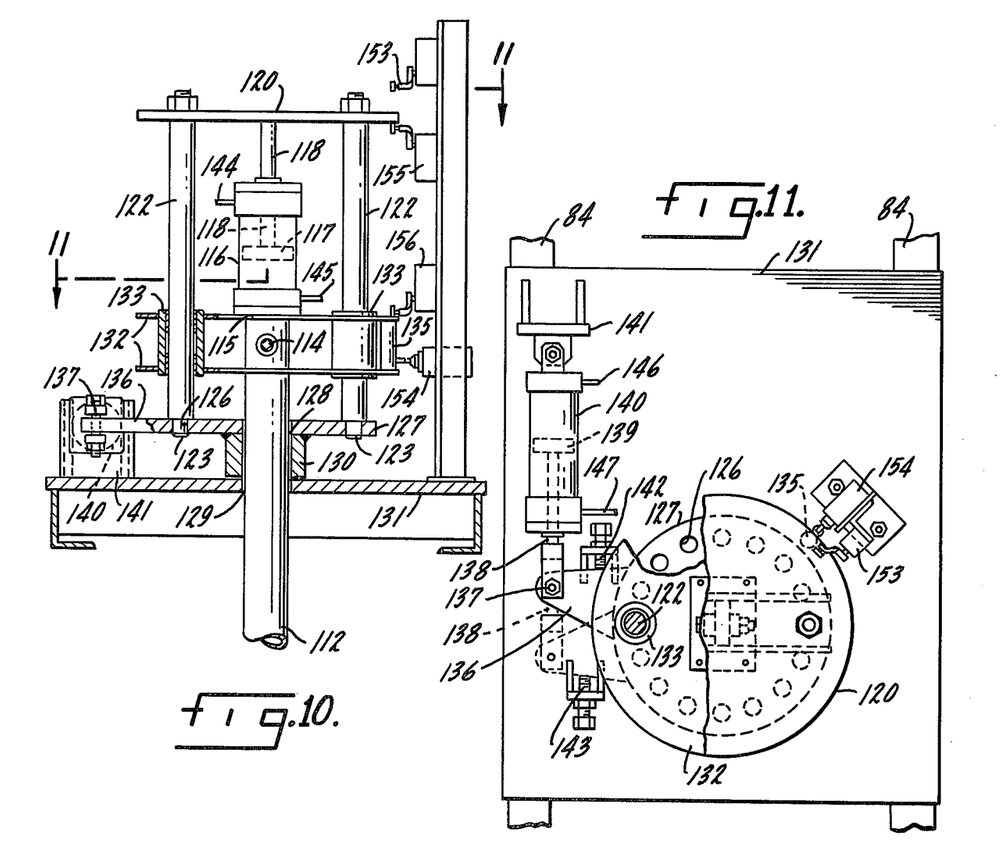
FIG. 10 is an enlarged, partially broken-away, cross-sectional view of the hood moving mechanism of the embodiment of FIGS. 7 and 8.
FIG. 11 is a cross-sectional view taken along the line 11—11 in FIG. 10.

Hood 100 is raised, lowered and rotated by the mechanism shown in FIGS. 10 and 11. A hollow, open-ended shaft 112 is attached perpendicularly at its lower end to hood 100, and the inside of shaft 112 communicates with the inside of hood 100 through a port 113. A hole 114 in shaft 112 may connect the inside of hood 100 to a source of pressurized gas that is controlled by valves (not shown) corresponding to valves 43 and 45, so that hood 100 may also be raised by air pressure in the manner described above with regard to the embodiment of FIGS. 1–5. The upper end 115 of shaft 112 is attached to and movable with a first cylinder 116. A first piston 117 in cylinder 116 is secured to one end of a rod 118, and the other end of rod 118 is connected to plate means 120. First piston 117 and cylinder 116 and shaft 112 are axially aligned at the center of tank 62, but the inside of shaft 112 does not communicate with the inside of cylinder 116. A pair of identical, parallel guide rods 122 are spaced on opposite sides of, and are parallel to, shaft 112. Rods 122 are attached to plate 120 at their upper ends, and their lower ends are reduced to define indexing pins 123 which fit into holes 126 in plate 127. There are two holes in plate 127 corresponding to each filter bed 61, and holes 126 are uniformly spaced around the circumference of a circle which is centered at the center of shaft 112. Plate 127 is journaled for partial rotation around shaft 112, and shaft 112 slides through holes 128 and 129. Plate 127 is supported by a bearing 130, which rests on plate means 131, which in turn is supported over tank 62 by beams 84. A pair of identical, spaced, parallel plates 132 are secured to shaft 112 and slidably receive guide rods 122, which pass through bushings 133 that connect plate 132 to each other. A limit switch actuating rod 135 is also attached to, and spans the space between, plates 132.

A projecting arm 136 integral with plate 127 is connected by a pin 137 to an end of a rod 138. The other end of rod 138 is connected to a second piston 139 in a second cylinder 140, which is attached by a bracket 141 to plate means 131. A pair of threaded, adjustable rotation limit stops 142 and 143 attached to plate means 131 accurately set the extent of travel of arm 136, and hence the amount that indexing plate 127 can rotate. Conventional air pressure lines 144 and 145 are connected to opposite ends of first cylinder 116, and conventional air pressure lines 146 and 147 are connected to opposite ends of second cylinder 140.

A valve 148 connected by conduit 149 to backwash pipe 107 and by conduit 150 to chamber 75, equalizes the pressure on opposite sides of hood 100 when it is opened in the same manner described above with regard to valve 50. A pressure differential indicating switch 151 connected between chamber 76 and conduit 149 indicates the amount of leakage under hood 100 when valve 148 is closed in the same manner described above with regard to switch 53.

Air is forced under pressure into the opposite ends of first cylinder 116 in a first predetermined sequence that raises and lowers hood 100, and air is forced under pressure into the opposite ends of second cylinder 140 in a second predetermined sequence coordinated with the first sequence that causes hood 100 to rotate or index from one filter 61 to another. These sequences are controlled by a conventional electrical control circuit. Assuming that hood 100 is seated on a filter 61 and backwashing is taking place, the parts of the mechanism would be in the positions shown in FIGS. 10 and 11. Air pressure applied through line 145 moves first piston 117 upwardly and this raises plate 120 until it contacts limit switch 153, which shuts off the air; raising of plate 120 lifts indexing pins 123 at the ends of guide rods 122 out of the holes 126 which correspond to the filter 61 then being backwashed. Air pressure applied through line 146 moves second piston 139 away from the end of cylinder 140 attached to bracket 141, and this pushes rod 138 out of cylinder 140; this moves arm 136 until it hits limit stop 143, as shown in phantom in FIG. 11, and indexes the next pair of holes 126 under ends 123. Rod 135 hits limit switch 154 which shuts off the air in line 146. Air pressure applied through line 144 moves piston 117 downwardly until plate 120 contacts limit switch 155; this lowers pins 123 into the just positioned holes 126. When the filter bed 61 being backwashed is sufficiently clean to be returned to service, as determined by a conventional timer or pressure actuated control circuit, valve 148 is opened and thus equalizes the pressure on opposite sides of hood 100; valve 108 is now closed. If air is also being used to raise hood 100, it would now be pumped through hole 114 into shaft 112 and thus into the hood through port 113; at the same time, air pressure applied through line 144 would raise cylinder 116 with respect to piston 117 until the upper plate 132 contacts limit switch 156, and thus would raise or unseat hood 100. Although plates 132 slide upwardly with cylinder 116 and shaft 112, pins 123 remain seated in holes 126. Air pressure applied through line 147 moves piston 139 so as to retract rod 138 into cylinder 140 and thus rotate or index plate 127 until rod 135 actuates limit switch 154 and arm 136 hits limit stop 142; this rotation of plate 127 also rotates rods 122 and plates 132 which are secured to shaft 112. Thus, hood 100 is indexed to a position over the next filter 61 in need of backwashing. If air pressure was also being used to raise hood 100, it is no longer supplied through hole 114 so hood 100 will begin to sink under the influence of gravity. To speed the seating of hood 100, air pressure is applied through line 145 which forces cylinder 116 downwardly until the hood and gasket 103 are firmly seated. Valve 148 is now closed, valve 108 is opened, and backwashing begins and continues until the control circuit causes the above sequences to be repeated.

It has thus been shown that by the practice of this invention a multibed liquid filter can be backwashed in a process that uses gas to float a backwash isolation hood out of sealing engagement with a filter bed without requiring mechanical implements that directly move the hood vertically. The process also causes the hood to sink into sealing engagement under influence of gravity and hydraulic pressure without the use of devices that exert mechanical force directly on the hood. The hood can also be raised and lowered by a unique mechanism that employs two pistons in cylinders and a perforated indexing plate, either with or without gas pressure. This makes it practical to use rotating backwash isolation hoods with relatively large (e.g. over 20 feet in diameter) open-topped, gravity filters utilizing granular filter media. Filters in accord with this invention have relatively low overall height, and do not require separate tanks for storage of backwash liquid. The amount of backwash liquid used is low because minimum free board above the pie-shaped, discrete filter beds is achieved by uniform liquid collection across the tip of the beds by the pie-shaped, perforated backwash hood. The embodiments shown in the drawing include features that lower cost by making efficient use of materials and space. For example, rods are not needed to support perforated plates 6 and 63, because they are attached to the underside of partitions 8 and 65, which function as rigid plate girders. When the unfiltered liquid chambers 19 and 75 also function as flocculation chambers, the dirty backwash liquid can be recycled so that the only waste from the system is sludge.

While the present invention has been described with reference to particular embodiments, it is not intended to illustrate or describe herein all of the equivalent forms or ramifications thereof. For example, the flange 102 and edge 66 sealing arrangement shown for the embodiment of FIGS. 7–11 could be used with the embodiment of FIGS. 1–6, and the hood undersurface 26 and flanges 9 of the FIGS. 1–6 embodiment could be used with the embodiment of FIGS. 7–11. Also, the words used are words of description rather than limitation, and various changes may be made without departing from the spirit or scope of the invention disclosed herein. It is intended in the appended claims to cover all changes as fall within the true spirit and scope of the invention.

What is claimed is:

1. A multibed gravity liquid filter comprising a tank having an inlet and an outlet, means in said tank supporting granular filter material and defining thereebeneath a filtered liquid chamber communicating with said outlet, a wall of said container extending above said granular filter material so as to define a chamber for unfiltered liquid, partitions extending upwardly from said granular material supporting means so as to divide said granular filter material into a plurality of beds, the upper terminal edge of each partition extending above said beds into said unfiltered liquid chamber, said upper edges providing sealable surfaces, a backwash isolation hood for sealing with the sealable surfaces provided by the partitions which define any of said beds, a backwash outlet connected to the underside of said hood, means for connecting said backwash outlet to said chamber for unfiltered liquid so as to equalize the pressure on opposite sides of said hood and thereby reduce the force required to lift said hood out of sealing engagement with said partitions, means for lifting said hood out of sealing engagement with said partitions, means for moving said hood from one bed to another, and means for lowering said hood into sealing engagement with said sealing surfaces.

2. The invention defined in claim 1, wherein said means for equalizing pressure comprises a liquid conduit connecting said backwash outlet to said unfiltered liquid chamber, and valve means for selectively opening and closing said conduit.

3. The invention defined in claim 2, further comprising pressure measuring means for detecting leakage between said hood and said sealable surfaces.

4. The invention defined in claim 3, wherein said means for detecting leakage comprises a pressure differential indicating switch connected to said filtered liquid chamber and to said liquid conduit between said valve means and said backwash outlet.

5. The invention defined in claim 1, wherein said means for moving said hood comprises means connecting the underside of said hood to a source of pressurized gas for floating said hood out of sealing engagement with said partitions, and means for venting the underside of said hood so as to release gas pressure and cause said hood to move into sealing engagement with said sealing surfaces.

6. The invention defined in claim 1, wherein said means for moving said hood comprises shaft means attached to said hood, a guide rod aligned with said shaft means, means connecting said guide rod to said shaft means, indexing plate means having at least one hole therein corresponding to each filter unit, an end of said shaft means fitting into such holes, a first piston and cylinder one of which is connected to said shaft means and the other of which is connected to said guide rod, a second piston and cylinder one of which is connected to said plate means, a source of hydraulic fluid connected to each end of each of said cylinders on opposite sides of their respective pistons, flow of said fluid to opposite ends of said first cylinder in a first predetermined sequence causing said shaft means and attached hood to be raised and lowered, and flow of said fluid to opposite ends of said second cylinder in a second predetermined sequence coordinated with said first predetermined sequence causing said disc means to move said hood from one filter unit to another.

7. A multiunit liquid filter comprising a backwash isolation hood movable to cover a specific filter unit in need of backwashing, and means for moving said hood from one unit to another, means connecting the underside of said hood to a source of pressurized gas for floating said hood out of sealing engagement with a filter unit, and means for venting the underside of said hood so as to release gas pressure and cause said hood to move into sealing engagement with another unit.

8. A multibed liquid filter comprising a container having an inlet and an outlet, means in said container supporting filter material and defining therebeneath a filtered liquid chamber communicating with said outlet, a wall of said container extending above said filter material so as to define a chamber for unfiltered liquid, partitions extending upwardly from said material supporting means so as to divide said filter material into a plurality of beds, the upper terminal edge of each partition extending above said beds into said unfiltered liquid chamber, said upper edges providing sealable surfaces, a backwash isolation hood for sealing with the sealable surfaces provided by the partitions which define any of said beds, a backwash outlet connected to the underside of said hood, means for moving said hood from one bed to another, means connecting the underside of said hood to a source of pressurized gas for floating said hood out of sealing engagement with said partitions, and means for venting the underside of said hood so as to release gas pressure and cause said hood to move into sealing engagement with said sealing surfaces.

9. The invention defined in claim 8, further comprising means for connecting said backwash outlet to said chamber for unfiltered liquid so as to equalize the pressure on opposite sides of said hood and thereby reduce the force required to lift said hood out of sealing engagement with said partitions.

10. The invention defined in claim 9, wherein said means for equalizing pressure comprises a liquid conduit connecting said backwash outlet to said unfiltered liquid chamber, and valve means for selectively opening and closing said conduit.

11. The invention defined in claim 10, further comprising means for detecting leakage between said hood and said sealable surfaces comprising a pressure differential indicating switch connected to said filtered liquid chamber and to said liquid conduit between said valve means and said backwash outlet.

12. The invention defined in claim 8, wherein said upper edges of said partitions terminate in the same plane.

13. The invention defined in claim 12, wherein said upper edges are flanges extending at right angles to said partitions.

14. The invention defined in claim 8, wherein said hood is hollow and has a perforated undersurface.

15. The invention defined in claim 14, wherein a protruding cylindrical collar extends perpendicularly from said hollow hood into a backwash outlet centerpipe connected to said backwash outlet, said collar being vertically movable in said center pipe.

16. A multibed gravity liquid filter comprising an opentopped tank having an inlet and an outlet, a perforated plate in said tank supporting granular filter material and defining therebeneath a filtered liquid chamber communicating with said outlet, a wall of said tank extending above said granular filter material so as to define a chamber for unfiltered liquid, partitions extending upwardly from said perforated plate so as to divide said granular filter material into a plurality of discrete beds, a perpendicular flange at the upper terminal edge of each partition extending above said discrete beds into said unfiltered liquid chamber, said flanges lying in the same plane and providing sealable surfaces, a hollow backwash isolation hood having a perforated, gasketed undersurface for sealing with the flanges on the partitions which define any of said discrete beds, a backwash outlet connected to the inside of said hood, means for rotating said hood from one discrete bed to another, means connecting the inside of said hood to a source of pressurized air for floating said hood out of sealing engagement with said flanges, and means for venting the inside of said hood to the atmosphere so as to release air pressure therein and cause said hood to sink under the influence of gravity into sealing engagement with said flanges.

17. A process for filtration of a liquid in a multiunit filter having a movable hood that isolates individual filter units during backwashing, comprising: passing liquid through said units until at least one unit requires backwashing, moving said hood into sealing engagement isolating said unit in need of backwashing from the other units, backwashing said unit by flowing backwashing liquid therethrough, forcing gas under pressure between said hood and unit so as to evacuate sufficient liquid from between said hood and unit to cause said hood to float above said unit and out of sealing engagement therewith, and moving said hood to another unit in need of backwashing.

18. The invention defined in claim 17, wherein said units are beds of granular material and liquid flows through said beds under the influence of gravity.

19. The invention defined in claim 18, wherein said hood is hollow and is filled with liquid until it sinks under the influence of gravity into sealing engagement with a unit in need of backwashing.

20. The invention defined in claim 17, further comprising hydraulically connecting opposite sides of said hood so as to equalize pressure before gas is forced between said hood and unit.

21. A process for gravity filtration of a liquid in a multibed filter having a submerged, rotatable, hollow hood that isolates individual beds during backwashing, comprising: flowing said liquid into an atmospheric pool of sufficient depth standing on the beds to cause said liquid to percolate through the beds under the influence of gravity until at least one bed requires backwashing, rotating said hood until it is over such bed in need of backwashing, filling said hood with said liquid until it sinks under the influence of gravity into sealing engagement isolating said bed from the other beds and said pool, backwashing said bed by flowing filtered liquid upwardly therethrough into said hood, terminating the flow of said filtered liquid into said hood, forcing air under pressure into said hood so as to evacuate sufficient liquid therefrom to cause said hood to float above said bed out of sealing engagement therewith, and rotating said hood over the next bed in need of backwashing.

22. A process for gravity filtration of a liquid in a multiunit filter having a movable hood that isolates individual filter units during backwashing, comprising: passing liquid under the influence of gravity through said units until at least one unit requires backwashing, moving said hood into sealing engagement isolating said unit in need of backwashing from the other units, backwashing said unit by flowing backwashing liquid therethrough equalizing the pressure on opposite sides of said hood, lifting said hood out of sealing engagement with said unit, and moving said hood to another unit in need of backwashing.

23. The invention defined in claim 22, wherein the pressure on opposite sides of said hood is equalized by hydraulically connecting the backwash liquid that has flowed through said bed with the unfiltered liquid.

24. A multiunit liquid filter comprising a backwash isolation hood movable to cover a specific filter unit in need of backwashing, and means for moving said hood from one filter unit to another comprising shaft means attached to said hood, a guide rod aligned with said shaft means, means for connecting said guide rod to said shaft means, indexing plate means having at least one hole therein corresponding to each filter unit, an end of said guide rod fitting into such holes, a first piston and cylinder one of which is connected to said shaft means and the other of which is connected to said guide rod, a second piston and cylinder one of which is connected to said plate means, a source of hydraulic fluid connected to each end of each of said cylinders on opposite sides of their respective pistons, flow of said fluid to opposite ends of said first cylinder in a first predetermined sequence causing said shaft means and attached hood to be raised and lowered, and flow of said fluid to opposite ends of said second cylinder in a second predetermined sequence coordinated with said first predetermined sequence causing said disc means to move said hood from one filter unit to another.

25. The invention defined in claim 24, wherein said first cylinder is attached to said shaft means, and said first piston is attached to said means connecting said guide rod to said shaft means.

26. The invention defined in claim 24, wherein said first piston and cylinder and said shaft means are axially aligned, and said shaft means is perpendicular to said hood.

27. The invention defined in claim 25, wherein a pair of guide rods are parallel to said shaft means and are spaced on opposite sides of said shaft means.

28. The invention defined in claim 24, wherein said holes in said indexing plate means are equally spaced around the circumference of a circle, and said plate means is mounted for partial rotation around an axis passing through the center of said circle.

29. The invention defined in claim 28, wherein said shaft means passes through the center of said circle.

30. The invention defined in claim 24, wherein said shaft means is hollow and connects a source of gas pressure to the underside of said hood.

31. A multiunit liquid filter comprising a backwash isolation hood movable to cover a specific filter unit in need of backwashing, and means for moving said hood from one filter unit to another comprising hollow shaft means attached perpendicularly to said hood, and connecting the underside of said hood to a source of gas pressure, a pair of guide rods on opposite sides of and parallel to said shaft means, means for connecting said guide rods to said shaft means, indexing plate means having a pair of holes therein corresponding to each filter unit, an end each of said guide rods fitting into said holes, said holes being equally spaced around the circumference of a circle, said shaft means passing through the center of said circle, said plate means being mounted for partial rotation around said shaft means, a first piston attached to said connecting means and a first cylinder attached to said shaft means, said first piston and cylinder and said shaft means being axially aligned, a second piston and cylinder one of which is connected to said plate means, a source of hydraulic fluid connected to each end of each of said cylinders on opposite sides of their respective pistons, flow of said fluid to opposite ends of said first cylinder in a first predetermined sequence causing said shaft means and attached hood to be raised and lowered, and flow of said fluid to opposite ends of said second cylinder in a second predetermined sequence causing said disc means to rotate said hood from one filter unit to another.

32. A multibed liquid filter comprising a container having an inlet and an outlet, means in said container supporting filter material and defining therebeneath a filtered liquid chamber communicating with said outlet, a wall of said container extending above said filter material so as to define a chamber for unfiltered liquid, partitions extending upwardly from said material supporting means so as to divide said filter material into a plurality of beds, the upper terminal edge of each partition extending above said beds into said unfiltered liquid chamber, said upper edges providing sealable surfaces, a backwash isolation hood for sealing with the sealable surfaces provided by the partitions which define any of said beds, a backwash outlet connected to the underside of said hood, means for moving said hood from one bed to another, comprising shaft means attached to said hood, a guide rod aligned with said shaft means, means for connecting said guide rod to said shaft means, indexing plate means having at least one hole therein corresponding to each filter bed an end of said guide rod fitting into such holes, a first piston and cylinder one of which is connected to said shaft means and the other of which is connected to said guide rod, a second piston and cylinder one of which is connected to said plate means, a source of hydraulic fluid connected to each end of each of said cylinders on opposite sides of their respective pistons, flow of said fluid to opposite ends of said first cylinder in a first predetermined sequence causing said shaft means and attached hood to be raised and lowered, and flow of said fluid to opposite ends of said second cylinder in a second predetermined sequence coordinated with said first predetermined sequence causing said disc means to move said hood from one filter unit to another.

33. The invention defined in claim 32, wherein said upper edges of said partitions terminate in the same plane.

34. The invention defined in claim 33, wherein an inverted U-shaped flange on the underside of said hood seals against said upper edges.

35. The invention defined in claim 32, wherein said hood is hollow and has a perforated undersurface.

36. The invention defined in claim 35, wherein a protruding cylindrical collar extends perpendicularly from said hollow hood into a backwash outlet centerpipe connected to said backwash outlet, said collar being vertically movable in said center pipe.

37. The invention defined in claim 32, further comprising means for connecting said backwash outlet to said chamber for unfiltered liquid so as to equalize the pressure on opposite sides of said hood and thereby reduce the force required to lift said hood out of sealing engagement with said partitions.

38. The invention defined in claim 37, wherein said means for equalizing pressure comprises a liquid conduit connecting said backwash outlet to said unfiltered liquid chamber, and valve means for selectively opening and closing said conduit.

39. The invention defined in claim 38, further comprising means for detecting leakage between said hood and said sealable surfaces comprising a pressure differential indicating switch connected to said filtered liquid chamber and to said liquid conduit between said valve means and said backwash outlet.

40. The combination comprising a multibed gravity liquid filter and flocculator, comprising a tank having an inlet and an outlet, plate means in said tank supporting granular filter material and defining beneath said plate means a filtered liquid chamber communicating with said outlet, said container extending above said granular filter material so as to define thereabove a floculation chamber for unfiltered liquid communicating with said inlet, partitions extending upwardly from said plate means so as to divide said granular filter material into a plurality of open topped beds, the upper terminal edge of each partition extending above said beds into said floculation chamber, said upper edges providing sealable surfaces, a backwash isolation hood above said beds for sealing with the sealable surfaces provided by the partitions which define any of said beds, a backwash outlet connected to the underside of said hood, means for lifting said hood out of sealing engagement with said partitions, means for rotating said hood from one bed to another, means for lowering said hood into sealing engagement with said sealing surfaces, pump means connecting said backwash outlet to said floculation chamber and returning dirty backwash liquid thereto, and means for removing settled sludge from said floculator.

41. The invention defined in claim 40, wherein said means for rotating said hood comprises means connecting the underside of said hood to a source of pressurized gas for floating said hood out of sealing engagement with said partitions, and means for venting the underside of said hood so as to release gas pressure and cause said hood to move into sealing engagement with said sealing surfaces.

42. The invention defined in claim 40, wherein said means for rotating said hood comprises shaft means attached to said hood, a guide rod aligned with said shaft means, means for connecting said guide rod to said shaft means, indexing plate means having at least one hole therein corresponding to each filter bed an end of said guide rod fitting into such holes, a first piston and cylinder one of which is connected to said shaft means and the other of which is connected to said guide rod, a second piston and cylinder one of which is connected to said plate means, a source of hydraulic fluid connected to each end of each of said cylinders on opposite sides of their respective pistons, flow of said fluid to opposite ends of said first cylinder in a first predetermined sequence causing said shaft means and attached hood to be raised and lowered, and flow of said fluid to opposite ends of said second cylinder in a second predetermined sequence coordinated with said first predetermined sequence causing said disc means to move said hood from one filter unit to another.

43. The invention defined in claim 40, further comprising means for connecting said backwash outlet to said floculation chamber so as to equalize the pressure on opposite sides of said hood.

44. The invention defined in claim 43, wherein said means for equalizing pressure comprises a liquid conduit connecting said backwash outlet to said floculation chamber, and valve means for selectively opening and closing said conduit.

45. The invention defined in claim 40, further comprising means for detecting leakage between said hood and said sealable surfaces comprising a pressure differential indicating switch connected to said filtered liquid chamber and to said liquid conduit between said valve means and said backwash outlet.

46. The invention defined in claim 40, wherein said upper edges of said partitions terminate in the same plane.

47. The invention defined in claim 40, wherein said upper edges are flanges extending at right angles to said partitions.

48. The invention defined in claim 40, wherein said hood is hollow and has a perforated undersurface.

49. The invention defined in claim 48, wherein a protruding cylindrical collar extends perpendicularly from said hollow hood into a backwash outlet centerpipe connected to said backwash outlet, said collar being vertically movable in said center pipe.

50. The combination comprising a multibed gravity liquid filter and floculator, comprising a circular tank having an inlet and an outlet, said floculator comprising a generally cylindrical vertical column centered in said tank and terminating below the top of said tank, plate means in said tank supporting granular filter material around said column and defining beneath said plate means a filtered liquid chamber communicating with said outlet, said container extending above said granular filter material so as to define a floculation chamber for unfiltered liquid, partitions extending upwardly from said plate means and radially outwardly from said column so as to divide said granular filter material into a plurality of beds, the upper terminal edge of each partition extending above said beds into said floculation chamber, said upper edges providing sealable surfaces, a backwash isolation hood for sealing with the sealable surfaces provided by the partitions which define any of said beds, a backwash outlet connected to the underside of said hood, means for lifting said hood out of sealing engagement with said partitions, means for rotating said hood from one bed to another, means for lowering said hood into sealing engagement with said sealing surfaces, pump means connecting said backwash outlet to said column and returning dirty backwash liquid to said floculator, and means for removing settled sludge from the bottom of said column.

51. The invention defined in claim 50, wherein said dirty backwash liquid is pumped through a series of nozzles in said column which cause turbulence in the liquid in said column.

52. The invention defined in claim 50, further comprising a protruding cylindrical collar extending perpendicularly from said hood into a backwash outlet pipe in the center of said column connected to said backwash outlet, said collar being rotatable and being vertically movable in said center pipe.

53. The invention defined in claim 52, further comprising a portion of said column being attached to said hood and movable therewith.

54. A multibed gravity liquid filter comprising a cylindrical tank having an inlet and an outlet, a perforated plate in said tank supporting granular filter material and defining therebeneath a filtered liquid chamber communicating with said outlet, a wall of said tank extending above said granular filter material so as to define a chamber for unfiltered liquid above said filter material, partitions extending radially from the center of said tank and upwardly from said perforated plate so as to divide said granular filter material into a plurality of discrete, generally pie-shaped, open-topped beds, the upper terminal edge of each partition extending above said discrete beds into said unfiltered liquid chamber, said upper terminal edges lying in the same horizontal plane and providing sealable surfaces, a hollow perforated backwash isolation hood having a gasketed undersurface for sealing with the sealable surfaces on said upper terminal edges, a backwash outlet connected to the inside of said hood, means for rotating said hood around an axis passing through the center of said tank from one discrete bed to another, means for lowering said hood into sealing engagement with said upper terminal edges, and means for raising said hood out of sealing engagement with said upper terminal edges.

55. The invention defined in claim 54, wherein said sealable surfaces of said terminal upper edges are flanges extending at right angles to said partitions.

56. The invention defined in claim 54, wherein said gasketed undersurface of said hood comprises an inverted U-shaped flange which captures said upper terminal edges which seal thereagainst.

57. The invention defined in claim 56, wherein a gasket is held within said U-shaped flange.

* * * * *

UNITED STATES PATENT AND TRADEMARK OFFICE
CERTIFICATE OF CORRECTION

PATENT NO. : 4,082,664
DATED : April 4, 1978
INVENTOR(S) : Anders Lindstol

It is certified that error appears in the above–identified patent and that said Letters Patent are hereby corrected as shown below:

In column 4, line 59 delete "pump 39" and insert --pump 30--

In column 12, line 64 delete "causing said disc means to rotate said hood from one filter unit to another" and insert --coordinated with said first predetermined sequence causing said disc means to rotate said hood from one filter unit to another.--

Signed and Sealed this

Twenty-ninth Day of August 1978

[SEAL]

Attest:

RUTH C. MASON
Attesting Officer

DONALD W. BANNER
Commissioner of Patents and Trademarks